United States Patent
Xu et al.

(10) Patent No.: US 10,341,830 B2
(45) Date of Patent: Jul. 2, 2019

(54) METHOD AND APPARATUS FOR SENDING OR FORWARDING INFORMATION

(71) Applicant: ZTE Corporation, Shenzhen (CN)

(72) Inventors: Hui Xu, Shenzhen (CN); Chuanxi Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 582 days.

(21) Appl. No.: 14/787,251

(22) PCT Filed: Oct. 10, 2013

(86) PCT No.: PCT/CN2013/084984
§ 371 (c)(1),
(2) Date: Feb. 9, 2016

(87) PCT Pub. No.: WO2014/173086
PCT Pub. Date: Oct. 30, 2014

(65) Prior Publication Data
US 2016/0157045 A1    Jun. 2, 2016

(30) Foreign Application Priority Data
Apr. 24, 2013    (CN) .......................... 2013 1 0145145

(51) Int. Cl.
*H04W 4/38*    (2018.01)
*H04W 4/70*    (2018.01)
(Continued)

(52) U.S. Cl.
CPC .............. *H04W 4/38* (2018.02); *H04L 61/106* (2013.01); *H04L 67/10* (2013.01); *H04W 4/70* (2018.02);
(Continued)

(58) Field of Classification Search
CPC ....... H04W 4/006; H04W 4/005; H04W 4/38; H04L 61/106; H04L 67/10; H04L 61/6054; H04L 61/605; H04L 61/6004
(Continued)

(56) References Cited

U.S. PATENT DOCUMENTS

2004/0059942 A1*  3/2004  Xie ...................... H04L 63/029
                                                                726/12
2013/0013555 A1   1/2013  Foti
(Continued)

FOREIGN PATENT DOCUMENTS

CN    101951597 A    1/2011
CN    102438015 A    5/2012

OTHER PUBLICATIONS

International Search Report for corresponding application PCT/CN2013/084984 filed Oct. 10, 2013; dated Jan. 30, 2014.
(Continued)

*Primary Examiner* — Chris Parry
*Assistant Examiner* — Weiwei Y Stiltner
(74) *Attorney, Agent, or Firm* — Cantor Colburn LLP

(57) ABSTRACT

Provided are a method and apparatus for sending or forwarding information. The sending method is applied to an M2M communication system and includes: a sending device sends to-be-sent information to a target device through a communication network, wherein the information carries one of the followings: a first ID, which is used for identifying the target device outside the communication network, and a second ID, which is used for identifying the target device inside the communication network; the sending device acquires a recognizable ID corresponding to the specified ID through the communication network; and the sending device sends the information to the target device through the communication network according to the recognizable ID. The technical problem that there is still no effective object identification solution which is compatible with various standard systems in the related arts is solved, and different M2M user equipment can be distinguished in the M2M communication system.

13 Claims, 7 Drawing Sheets

(51) Int. Cl.
*H04L 29/08* (2006.01)
*H04L 29/12* (2006.01)

(52) U.S. Cl.
CPC ........ *H04L 61/6004* (2013.01); *H04L 61/605* (2013.01); *H04L 61/6054* (2013.01)

(58) Field of Classification Search
USPC .......................................................... 709/201
See application file for complete search history.

(56) References Cited

U.S. PATENT DOCUMENTS

| | | | | |
|---|---|---|---|---|
| 2014/0038549 | A1* | 2/2014 | Lehane | H04W 24/02 455/406 |
| 2014/0206403 | A1* | 7/2014 | Buckley | H04W 4/14 455/466 |
| 2014/0286237 | A1* | 9/2014 | Bhalla | H04W 4/005 370/328 |
| 2015/0208232 | A1* | 7/2015 | Liebhart | H04W 4/005 370/328 |

OTHER PUBLICATIONS

3rd Generation Partnership Project: Technical Specification Group Services and Systems Aspects, vol. SA WG2, No. V.11.3.0, Dec. 18, 2012; pp. 1-29, XP050691117.
3rd Generation Partnership Project: Technical Specification Group Services and Systems Aspects, vol. SA WG2, No. V.6.0, Dec. 18, 2012; pp. 1-95, XP050691121.
3rd Generation Partnership Project: Technical Specification Group Services and Systems Aspects, vol. SA WG2, No. V11.0.0, Sep. 18, 2012; pp. 1-165, XP050649142.
European Search Report for corresponding application EP13882819; Report dated Jun. 10, 2016.

* cited by examiner

METHOD AND APPARATUS FOR SENDING OR FORWARDING INFORMATION

TECHNICAL FIELD

The present disclosure relates to the field of communications of Internet of things, in particular to a method and an apparatus for sending or forwarding information.

BACKGROUND

Machine to Machine (M2M) communication technologies refer to all technologies and means for establishing connection between machines. The study on application scenarios of the M2M communication shows that providing M2M communication in the mobile network has a potential marketing prospect. Whereas, the M2M service puts forward many new requirements on the system; in order to enhance the competitiveness of the mobile network in this aspect, it is necessary to optimize the mobile network in the related art to support the M2M communication more effectively.

The mobile communication network in the related art is designed mainly for people-to-people communication and is not optimized sufficiently for the machine-to-machine and people-to-machine communication. In addition, how to provide an M2M communication service by an operator in a low cost is the key for deploying the M2M communication successfully.

Thus, it is necessary to study a solution for supporting the M2M communication for the mobile network, and the solution should utilize the existing network as much as possible and reduce the influence of a great amount of M2M communication on the network and the complexity of operation and maintenance.

For the existing telecommunication market, the competition is becoming increasingly intensive, the tariff and the profit margin of the operator are reducing continuously, and the communication market based on people is becoming saturated, so that the M2M is a brand new development opportunity for the operator.

At present, a new global organization one M2M is found by a league consisting of multiple standard organizations to ensure the effective deployment of an M2M communication system. The M2M is the supporting technology of the Internet of things and can realize an intelligent city in the future. The M2M allows various electronic devices to communicate with one another through a connectable wireless sensor and the SIM card of the mobile Internet and is responsible for management, monitoring and service provision. The number of M2M connections in the whole world is growing exponentially, and it is expected that the large number of connections can be deployed in nearly all the main markets, including medical treatment, transportation, energy, agriculture and the like. The standard specification stipulated by the oneM2M provides a universal M2M service layer, which can be embedded into various hardware and software and can be coupled with numerous field devices. The organization establishes a global end-to-end specification for the M2M in order to reduce the cost, shorten the time to market, create the scale economies, simplify the application and development, and avoid the overlapping of the standard. The league consists of seven standard organizations, which are studying and making technical specification and report so as to ensure that the M2M device can implement communication on a worldwide scale successfully. The system architecture of the oneM2M is under discussion now, and its concept diagram is as shown in FIG. 1. The upper-layer protocol architecture of the oneM2M is as shown in FIG. 2.

To implement the interconnection and interworking of the Internet of things globally, the standardization is an important problem to be solved urgently. To connect various objects to the network and implement the things-to-things, things-to-system and things-to-people communication and various applications based on such communication, it is necessary to identify various entities involved in the Internet of things effectively and uniquely at first. Identification is a method for recognizing various physical and logic entities of the Internet of things automatically. After the recognition is completed, the information of objects can be integrated and shared, the objects can be managed and controlled, and related data can be routed and positioned correctly, and accordingly, various applications of Internet of things can be implemented based on the above mentioned operations.

The Internet of things mainly adopts an endowed Identity (ID). The endowed ID is one allocated artificially to facilitate the recognition, such as an article code, a phone number and an Internet Protocol (IP) address, and usually consists of the combination of numbers, letters and other symbols according to a certain encoding rule. Compared with an essential ID based on natural attributes, the endowed ID is simple in form and easy to save, read and process, thereby serving as the main form of IDs in the Internet of things at present.

In the Internet of things, there are mainly three types of objects needing to be identified, i.e., physical entities, communication entities and application entities. The physical entity refers to any object which may contact with the Internet in various application and management processes of the Internet of things, such as acquiring, transmitting and processing information and controlling an object, for example, the physical entity may be various sensors, executors, labelled objects (such as animals, goods and food) and various intelligent apparatuses (such as digital products and household appliances). The communication entity refers to various communication hardware entities and logic entities involved in the things-to-things, things-to-system and things-to-people communication processes. The hardware entity may include a mobile phone, an M2M gateway and the like, and the logic entity may include a communication protocol, a session, a port and the like. The application entity refers to various services and information resources involved in the Internet of things, such as a Web service, digital content, aggregated data and the like. Object IDs mainly identify the physical entity and the communication hardware entity needing to be identified in the Internet of things.

The object ID based on a barcode and a Radio Frequency Identification (RFID) tag is mainly used for distinguishing, information tracing, information exchange and associated operation on the object, and is mainly suitable for a non-intelligent object, such as a container and food. The communication ID is used for identifying a logic entity related to the transmission and exchange of information data, and is mainly adopted for addressing and implementing the correct routing and positioning of information; these logic entities include communication protocol, session, port and the like, such as an IP address, an E.164 number, an International Mobile Subscriber ID (IMSI) number, a Session Initiation Protocol (SIP) Uniform Resource Identifier (URI), various port numbers and the like. The application ID mainly identifies various application entities in the Internet of things, including various services, information resources and the like, such as an URI and a content ID. The communication ID and the application ID in the Internet of things are usually stored in a computer and other intelligent devices, while the object ID needs to be stored in a specified carrier, and is written via a specified technology before use and read out via a corresponding technology when needed. In term of the identification, the problem needing to be solved urgently for the Internet of things in comparison with the conventional Internet and the conventional telecommunication network mainly focuses on the object ID, followed by the communication ID. Due to the large-scale distributive characteristic of the Internet of things, a strong extensible object ID system is required. How to build a unified object identifying and parsing system which is compatible with various standard systems and how to deal with the large-scale increase of requirements of the object communication on the number of communication IDs are key problems to be solved by the Internet of things.

To solve the problem in the related arts, there is still no effective solution yet.

SUMMARY

To solve the technical problem that there is still no effective object identification solution which is compatible with various standard systems in the related arts, embodiments of the present disclosure provide a method and an apparatus for sending or forwarding information, to at least solve the problem above.

An embodiment of the present disclosure provides a method for sending information, which is applied to an M2M communication system and includes: a sending device sends to-be-sent information to a target device through a communication network, wherein the to-be-sent information carries one of the following specified identities (IDs): a first ID, which is used for identifying the target device outside the communication network, and a second ID, which is used for identifying the target device inside the communication network; the sending device acquires a recognizable ID corresponding to the specified ID through the communication network; and the sending device sends the to-be-sent information to the target device through the communication network according to the recognizable ID.

In an example embodiment, the sending device acquiring the recognizable ID corresponding to the specified ID through the communication network includes one of the followings: when the sending device is located outside the communication network and the target device is located inside the communication network, the sending device acquires an internal ID of the target device within the communication network through the communication network according to the first ID; and when the sending device is located inside the communication network and the target device is located outside the communication network, the sending device acquires an external ID of the target device outside the communication network through the communication network according to the second ID.

In an example embodiment, the sending device acquiring the recognizable ID corresponding to the specified ID through the communication network includes: the recognizable ID is determined according to a corresponding relationship between the first ID and the recognizable ID, wherein the corresponding relationship is preset in the communication network; or the recognizable ID is determined according to a corresponding relationship between the second ID and the recognizable ID, wherein the corresponding relationship is preset in the communication network.

In an example embodiment, the first ID includes at least one of the following IDs: a service ID, an application ID, and a device ID of an M2M device.

In an example embodiment, the second ID includes at least one of the following IDs: a device ID of the M2M device, and a user ID of the M2M device.

In an example embodiment, the to-be-sent information further carries an ID of the sending device.

Another embodiment of the present disclosure provides a method for forwarding information, which is applied to an M2M communication system and includes: a network side entity which is located in a communication network receives to-be-sent information which is sent from a sending device to a target device through the communication network, wherein the to-be-sent information carries one of the following specified identities (IDs): a first ID, which is used for identifying the target device outside the communication network, and a second ID, which is used for identifying the target device inside the communication network; the network side entity acquires a recognizable ID corresponding to the specified ID according to the specified ID; and the network side entity forwards the to-be-sent information to the target device according to the recognizable ID.

In an example embodiment, the network side entity acquiring the recognizable ID corresponding to the specified ID according to the specified ID includes one of the followings: when the sending device is located outside the communication network and the target device is located inside the communication network, the network side entity acquires an internal ID of the target device within the communication network according to the first ID; and when the sending device is located inside the communication network and the target device is located outside the communication network, the network side entity acquires an external ID of the target device outside the communication network according to the second ID.

In an example embodiment, the network side entity acquiring the recognizable ID corresponding to the specified ID according to the specified ID includes: the network side entity determines the recognizable ID according to a corresponding relationship between the first ID and the recognizable ID, wherein the corresponding relationship is preset in the communication network; or the network side entity determines the recognizable ID according to a corresponding relationship between the second ID and the recognizable ID, wherein the corresponding relationship is preset in the communication network.

In an example embodiment, the first ID includes at least one of the following IDs: a service ID, an application ID, and a device ID of an M2M device.

In an example embodiment, the second ID includes at least one of the following IDs: a device ID of the M2M device, and a user ID of the M2M device.

Another embodiment of the present disclosure provides an apparatus for sending information, which is applied to an M2M communication system and includes: a first sending component, which is located in a sending device and is configured to send to-be-sent information to a target device through a communication network, wherein the to-be-sent information carries one of the following specified identities (IDs): a first ID, which is used for identifying the target device outside the communication network, and a second ID, which is used for identifying the target device inside the communication network; an acquisition component, which is located in the sending device and is configured to acquire a recognizable ID corresponding to the specified ID through the communication network; and a second sending component, which is located in the sending device and is configured to send the to-be-sent information to the target device through the communication network according to the recognizable ID.

In an example embodiment, the acquisition component includes: a first acquisition element, which is configured to, when the sending device is located outside the communication network and the target device is located inside the communication network, acquire an internal ID of the target device within the communication network through the communication network according to the first ID; and/or a second acquisition element, which is configured to, when the sending device is located inside the communication network and the target device is located outside the communication network, acquire an external ID of the target device outside the communication network through the communication network according to the second ID.

Another embodiment of the present disclosure provides an apparatus for forwarding information, which is applied to an M2M communication system and includes: a receiving component, which is located in a network side entity in a communication network and is configured to receive to-be-sent information which is sent from a sending device to a target device through the communication network, wherein the to-be-sent information carries one of the following specified identities (IDs): a first ID, which is used for identifying the target device outside the communication network, and a second ID, which is used for identifying the target device inside the communication network; an acquisition component, which is located in the network side entity and is configured to acquire a recognizable ID corresponding to the specified ID according to the specified ID; and a forwarding component, which is located in the network side entity and is configured to forward the to-be-sent information to the target device according to the recognizable ID.

In an example embodiment, the acquisition component includes: a first acquisition element, which is configured to, when the sending device is located outside the communication network and the target device is located inside the communication network, acquire an internal ID of the target device within the communication network according to the first ID; and/or a second acquisition element, which is configured to, when the sending device is located inside the communication network and the target device is located outside the communication network, acquire an external ID of the target device outside the communication network according to the second ID.

Through the embodiments, the to-be-sent information which is sent from the sending device to the communication network carries a specified ID, a recognizable ID can be acquired according to the specified ID, and the to-be-sent information can be sent to the target device according to the recognizable ID, the technical problem that that there is still no effective object identification solution which is compatible with various standard systems in the related arts is solved, and different M2M user equipment can be distinguished in the M2M communication system.

BRIEF DESCRIPTION OF THE DRAWINGS

The drawings illustrated here are to provide further understanding of the present disclosure and constitute one part of the application, and the exemplary embodiments of the present disclosure and the explanations thereof are intended to explain the present disclosure, instead of improperly limiting the present disclosure. In the drawings.

DETAILED DESCRIPTION OF THE EMBODIMENTS

The present disclosure will be described below in combination with the drawings and embodiments in detail. It should be noted that, in case of no conflict, the embodiments of the application and features therein can be combined with one another.

Figure 1:
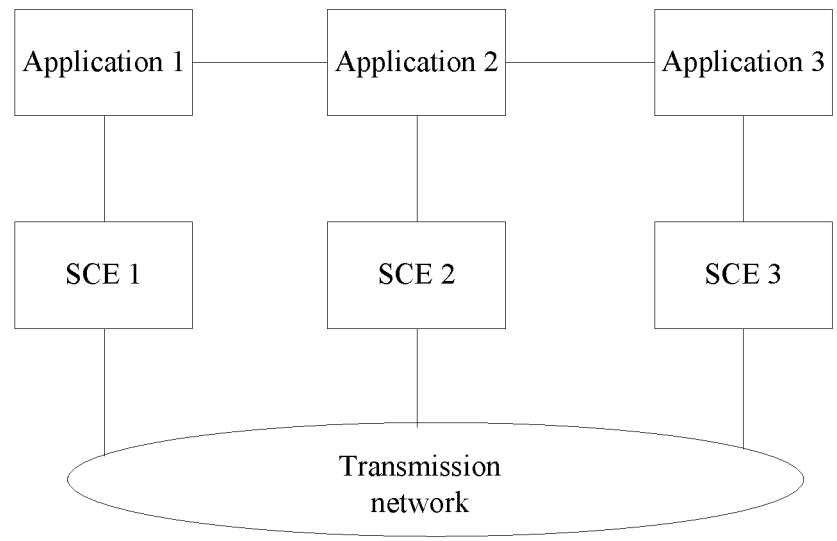
FIG. 1 is a diagram showing the system architecture in oneM2M according to the related arts.
Figure 2:
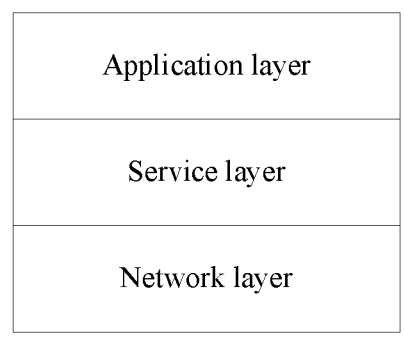
FIG. 2 is a diagram showing the protocol architecture in oneM2M according to the related arts.
Figure 3:
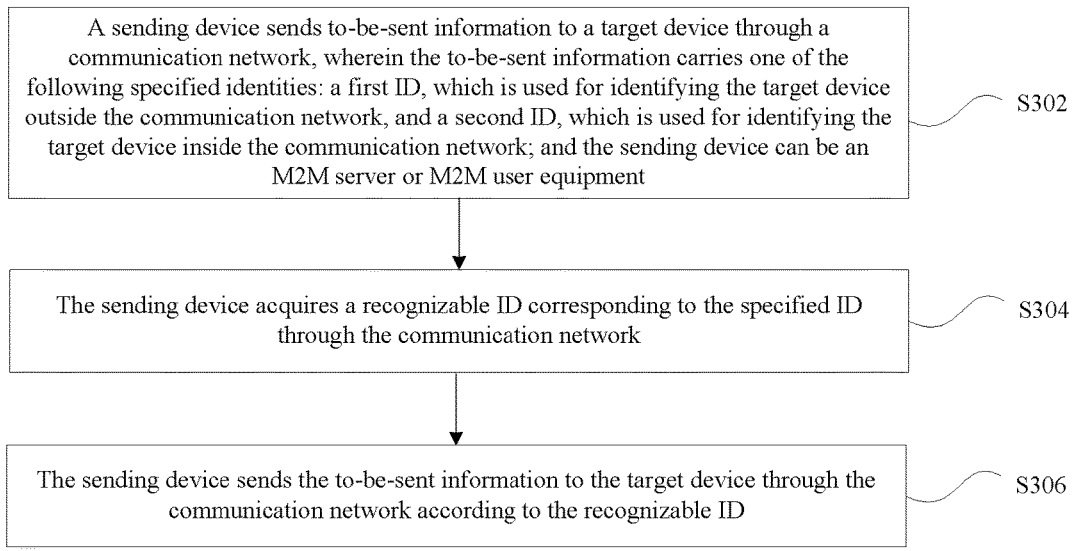
FIG. 3 is a flowchart of a method for sending information according to an embodiment of the present disclosure.

FIG. 3 is a flowchart of a method for sending information according to an embodiment of the present disclosure. The method shown in FIG. 3 is applied to an M2M communication system and includes steps as follows.

Step S302: A sending device sends to-be-sent information to a target device through a communication network, wherein the to-be-sent information carries one of the following specified identities (IDs): a first ID, which is used for identifying the target device outside the communication network, and a second ID, which is used for identifying the target device inside the communication network. In the embodiment, the sending device may be an M2M server or M2M user equipment.

Step S304: The sending device acquires a recognizable ID corresponding to the specified ID through the communication network.

Step S306: The sending device sends the to-be-sent information to the target device through the communication network according to the recognizable ID.

Through the steps above, the to-be-sent information sent from the sending device to the communication network carries the specified IDs, and the recognizable ID corresponding to the specified ID can be acquired by the communication network, and accordingly, the information is sent to the target device according to the recognizable ID, so that the conversion between the specified ID sent by a sending end and the recognizable ID can be implemented, and different M2M user equipment can be distinguished in the M2M communication system.

In the embodiment, the sending device may acquire the recognizable ID corresponding to the specified ID through the communication network in various ways. For example, when the sending device is located outside the communication network and the target device is located inside the communication network, the sending device acquires an internal ID of the target device within the communication network through the communication network according to the first ID; and when the sending device is located inside the communication network and the target device is located outside the communication network, the sending device acquires an external ID of the target device outside the communication network through the communication network according to the second ID.

In the above-mentioned process, the sending device may acquire the recognizable ID corresponding to the specified ID through the communication network by converting the first ID or the second ID (such as the conversion of formats and content) or in the following ways: the recognizable ID is determined according to a corresponding relationship between the first ID and the recognizable ID, wherein the corresponding relationship is preset in the communication network; or the recognizable ID is determined according to a corresponding relationship between the second ID and the recognizable ID, wherein the corresponding relationship is preset in the communication network.

In the embodiment, the first ID may include at least one of the following IDs: a service ID, an application ID, and a device ID of an M2M device, wherein the service ID and the application ID may be a Universal Resource Identifier (URI); and the second ID may include at least one of the following IDs: a device ID of an M2M device, and a user ID of an M2M device.

In example implementation of the embodiment, the to-be-sent information may further carry an ID of the sending device, so that the communication network or a receiving end can verify the sending device according to a preset rule or feed corresponding information (such as response information) and the like back to the sending device.

To be understood better, the embodiment is described below in combination with an example embodiment. In the example embodiment, an external ID is used for indicating an application ID, an internal ID is used for indicating a communication ID, and a communication network is used for representing a transmission network.

Figure 4:
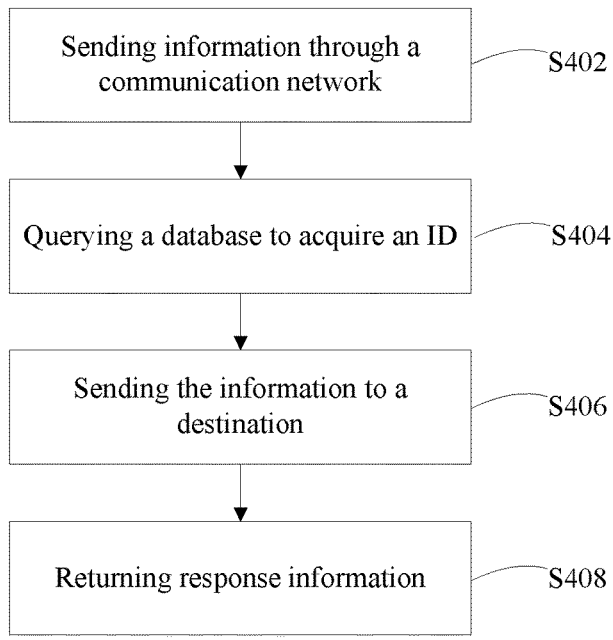
FIG. 4 is a flowchart of a method for sending information according to an example embodiment of the present disclosure.

As shown in FIG. 4, the method includes the followings steps.

Step S402: Information is sent through a communication network, wherein the information contains the ID of an M2M device.

The process of sending the information includes sending the information from an M2M server to the M2M device and sending the information from the M2M device to the M2M server.

The M2M server may include an Application Entity (AE) and a Service Capability Entity (SCE). The communication between the AE and the SCE is conducted via a predefined Application Program Interface (API).

The communication network may be a cellular network, a Wireless Local Area Network (WLAN), a wired network or a satellite network, wherein the cellular network may be a 3GPP or 3GPP2 or WiMax network; and the communication network is coupled with the application entity through an SCE.

The external ID of the M2M device is used for identifying target M2M user equipment. As an alternative, the external ID of the M2M device may be an external group ID and is used for identifying a group of M2M devices. The external ID of the M2M device keeps unique in an M2M system and consists of two parts: a service ID or application ID, and a local ID. The service or the application ID is used for indicating different services in the M2M application entity and there is a corresponding service component in the M2M device. The local ID is used for indicating the M2M device itself, namely, it is used for identifying the M2M device outside the communication network. The external ID may be in various forms, such as E.164 Mobile Station International ISDN Number (MSISDN), a URI, a Fully Qualified Domain Name (FQDN), an IPv4/IPv6. The internal ID may be in various forms, such as an E.212 International Mobile Subscriber ID (IMSI), an International Mobile Equipment ID (IMEI), and an Integrated Circuit Card ID (ICCID), and the specific form is determined by a communication network operator.

It should be noted that this step may be that the information is sent from or to a Short Message Entity (SME), the information contains an ID and is in a form of a short message, and the SME serves as an SCE.

Step S404: The communication network queries a user information database to obtain the ID of the M2M device.

The communication network authenticates or authorizes the SCE/M2M device sending the information at first, namely, judging whether the SCE/M2M device is valid and is allowed to send data. The authentication and the authorization may be carried out according to the user information database and/or local information.

The user information database is located in the communication network and saves a mapping relationship between the external ID and the internal ID of the M2M device and may also save other data information related to the user equipment.

The communication network sends the external ID of the M2M device to the user information database, and the user information database queries the internal ID corresponding to the external ID and returns the internal ID to the communication network entity; and if the external ID of the M2M device is not found in the user information database, failure information is returned. The communication network sends the internal ID of the M2M device to the user information database, and the user information database queries one or more external IDs corresponding to the internal ID and returns the one or more external IDs to the communication network entity; and if the internal ID of the M2M device is not found in the user information database, failure information is returned. One or more external IDs may be mapped to one internal ID.

Step S406: The communication network sends M2M information to a destination (i.e., a target device).

The communication network sends the M2M information to the M2M device or the M2M server according to the internal/external ID of the M2M device.

Step S408: The M2M user equipment receiving the information sends response information to the information sending device.

The M2M user equipment receives the information from the M2M server and forwards the information to a corresponding M2M service component in the M2M device; and if the M2M user equipment receives the information successfully, response information indicating successful reception is sent to the M2M server; otherwise, response information indicating reception failure is sent or no response information is sent.

The M2M server receives and processes the information from the M2M device; if the M2M server receives the information successfully, response information indicating successful reception is sent to the M2M device; otherwise, response information indicating reception failure is sent or no response information is sent.

Figure 5:
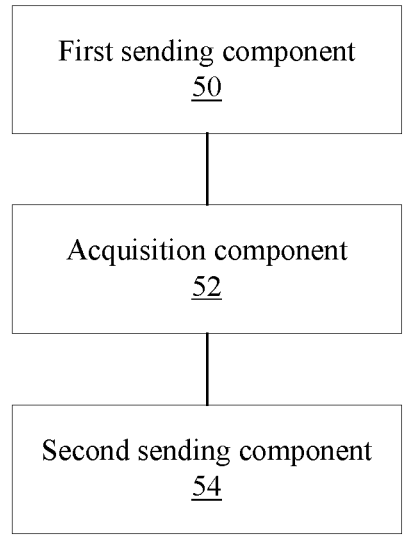
FIG. 5 is a block diagram showing a structure of an apparatus for sending information according to an embodiment of the present disclosure.

An embodiment further provides an apparatus for sending information, which is applied to an M2M communication system and is configured to implement the embodiments and the example embodiments. The apparatus has been described above, thereby needing no further description here, and only the components involved in the apparatus are described below. As below, the term "component" can implement the combination of software and/or hardware of predetermined functions. Although the apparatus described in the following embodiments is preferably implemented by software, the implementation of hardware or the combination of the software and hardware can also be composed. FIG. 5 is a block diagram showing a structure of an apparatus for sending information according to an embodiment of the present disclosure. As shown in FIG. 5, the apparatus includes:

a first sending component 50 which is located in a sending device and coupled with an acquisition component 52, and is configured to send to-be-sent information to a target device through a communication network, wherein the to-be-sent information carries one of the following specified identities (IDs): a first ID, which is used for identifying the target device outside the communication network, and a second ID, which is used for identifying the target device inside the communication network;

the acquisition component 52, which is located in the sending device and coupled with a second sending component 54, and is configured to acquire a recognizable ID corresponding to the specified ID through the communication network; and the second sending component 54, which is located in the sending device and is configured to send the to-be-sent information to the target device according to the recognizable ID through the communication network.

Through the function implemented by each component, the conversion between the specified ID carried by a sending end and the recognizable ID can be implemented, so that different M2M user equipment can be distinguished in the M2M communication system.

Figure 6:
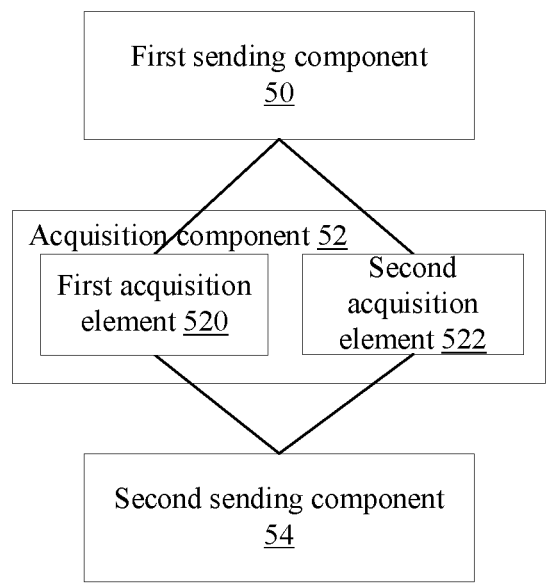
FIG. 6 is a block diagram showing another structure of an apparatus for sending information according to an embodiment of the present disclosure.

In an example embodiment, as shown in FIG. 6, the acquisition component 52 may include at least one of the following processing elements: a first acquisition element 520, which is configured to, when the sending device is located outside the communication network and the target device is located inside the communication network, acquire an internal ID of the target device within the communication network through the communication network according to the first ID, and a second acquisition element 522, which is configured to, when the sending device is located inside the communication network and the target device is located outside the communication network, acquire an external ID of the target device outside the communication network through the communication network according to the second ID.

Figure 7:
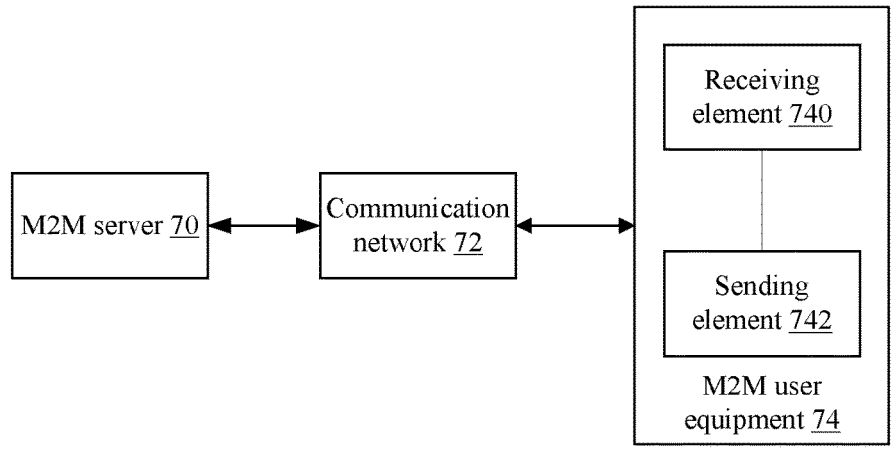
FIG. 7 is a diagram showing a structure of a system for identifying an M2M device according to an example embodiment of the present disclosure.

To implement the embodiment and the example embodiment, an embodiment further provides a system for identifying an M2M device, as shown in FIG. 7, the system includes: an M2M server 70, a communication network 72, and M2M user equipment 74.

The M2M server 70 is configured to add an external ID into the information sent to the M2M user equipment 74 and send the information to the communication network 72. The M2M server 70 includes but is not limited to: an M2M application entity and an M2M service capability entity.

The communication network 72 is configured to judge whether the M2M server 70 sending the information is valid and send the received information to the M2M user equipment 74, and is specifically configured to receive the information and convert the external ID into an internal ID through a user information database. The communication network 72 includes but is not limited to: a cellular network, a wired network, a satellite network, a WLAN and a WiMax.

The M2M user equipment 74 is configured to receive the information and forward the information to a corresponding service component for processing, and the M2M user equipment 74 is further configured to send response information to the M2M server 70.

As shown in FIG. 7, the M2M user equipment 74 in the embodiment may include: a receiving element 740 and a sending element 742, wherein the receiving element 740 is configured to receive information from the communication network 72; and the sending element 742 is configured to send response information to the M2M server and is further configured to forward the information received by the receiving element 740 to the M2M service component.

The M2M user equipment in the embodiment is one having an M2M function and includes but is not limited to: an intelligent terminal having an M2M function (such as a smart phone/a data card/a tablet personal computer), an M2M gateway and an M2M functional component.

Figure 8:
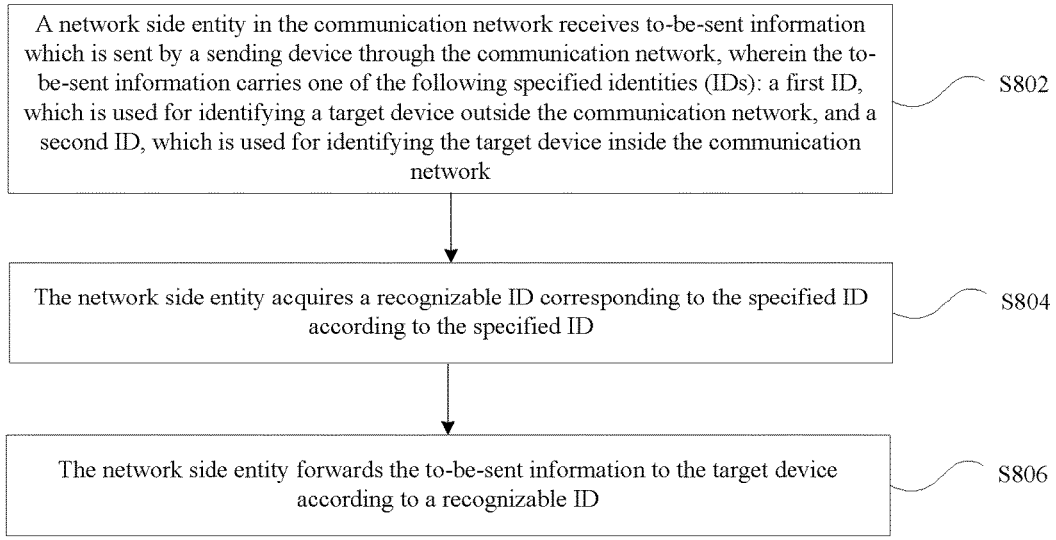
FIG. 8 is a flowchart of a method for forwarding information according to an embodiment of the present disclosure.

In order to understand the function of the communication network in the embodiment, an embodiment further provides a method for forwarding information, which is applied to an M2M communication system, and as shown in FIG. 8, the method includes the followings steps.

Step S802: A network side entity in the communication network receives to-be-sent information which is sent by a sending device through the communication network, wherein the to-be-sent information carries one of the following specified identities (IDs): a first ID, which is used for identifying a target device outside the communication network, and a second ID, which is used for identifying the target device inside the communication network.

Step S804: The network side entity acquires a recognizable ID corresponding to the specified ID according to the specified ID.

Step S806: The network side entity forwards the to-be-sent information to the target device according to a recognizable ID.

In an example embodiment, the network side entity may acquire the recognizable ID corresponding to the specified ID according to the specified ID in one of the following processes: (1) when the sending device is located outside the communication network and the target device is located inside the communication network, the network side entity acquires an internal ID of the target device within the communication network according to the first ID; and (2) when the sending device is located inside the communication network and the target device is located outside the communication network, the network side entity acquires an external ID of the target device outside the communication network according to the second ID.

Based on the process, in an example implementation of the embodiment, the network side entity may acquire the recognizable ID corresponding to the specified ID according to the specified ID in at least one of the following ways: the network side entity determines the recognizable ID according to a corresponding relationship between the first ID and the recognizable ID, wherein the corresponding relationship is preset in the communication network; and the network side entity determines the recognizable ID according to a corresponding relationship between the second ID and the recognizable ID, wherein the corresponding relationship is preset in the communication network.

In an example embodiment, the first ID may include at least one of the following IDs: a service ID, an application ID, and a device ID of an M2M device. The second ID may include at least one of the following IDs: a device ID of the M2M device, and a user ID of the M2M device.

Figure 9:
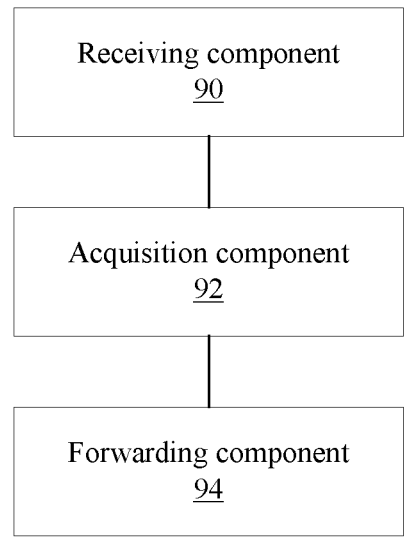
FIG. 9 is a block diagram showing a structure of an apparatus for forwarding information according to an embodiment of the present disclosure.

An embodiment further provides an apparatus for forwarding information, which is applied to an M2M communication system and is configured to implement the forwarding method. As shown in FIG. 9, the apparatus includes:

a receiving component 90, which is located in a network side entity in a communication network and coupled with an acquisition component 92, and is configured to receive to-be-sent information which is sent from a sending device to a target device through the communication network, wherein the to-be-sent information carries one of the following specified identities (IDs): a first ID, which is used for identifying the target device outside the communication network, and a second ID, which is used for identifying the target device inside the communication network;

an acquisition component 92, which is located in the network side entity and is configured to acquire a recognizable ID corresponding to the specified ID according to the specified ID; and a forwarding component 94, which is located in the network side entity and is configured to forward the to-be-sent information to the target device according to the recognizable ID.

Figure 10:
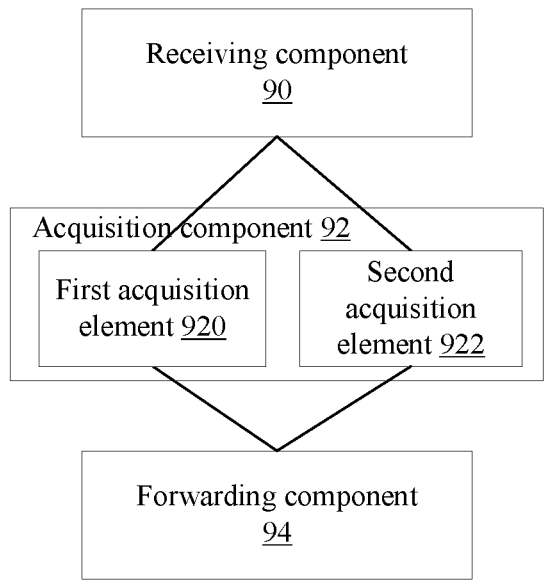
FIG. 10 is a block diagram showing another structure of an apparatus for forwarding information according to an embodiment of the present disclosure.

In an example embodiment, as shown in FIG. 10, the acquisition component 92 includes: a first acquisition element 920, which is configured to, when the sending device is located outside the communication network and the target device is located inside the communication network, acquire an internal ID of the target device within the communication network according to the first ID; and/or a second acquisition element 922, which is configured to, when the sending device is located inside the communication network and the target device is located outside the communication network, acquire an external ID of the target device outside the communication network according to the second ID.

As described above, the components involved in the embodiment can be implemented by software or corresponding hardware. For example, the components above can be located in a processor.

To understand the embodiments and the example embodiments better, the processes for sending information from M2M user equipment to a server and sending information from the server to the M2M user equipment are described below in detail. The main design idea of the embodiments is as follows: an M2M user ID includes an external ID and an internal ID; the mapping relationship between the external ID and the internal ID is stored in a user information database; and the external ID and the internal ID are converted through an entity network in the communication network.

Embodiment 1

Figure 11:
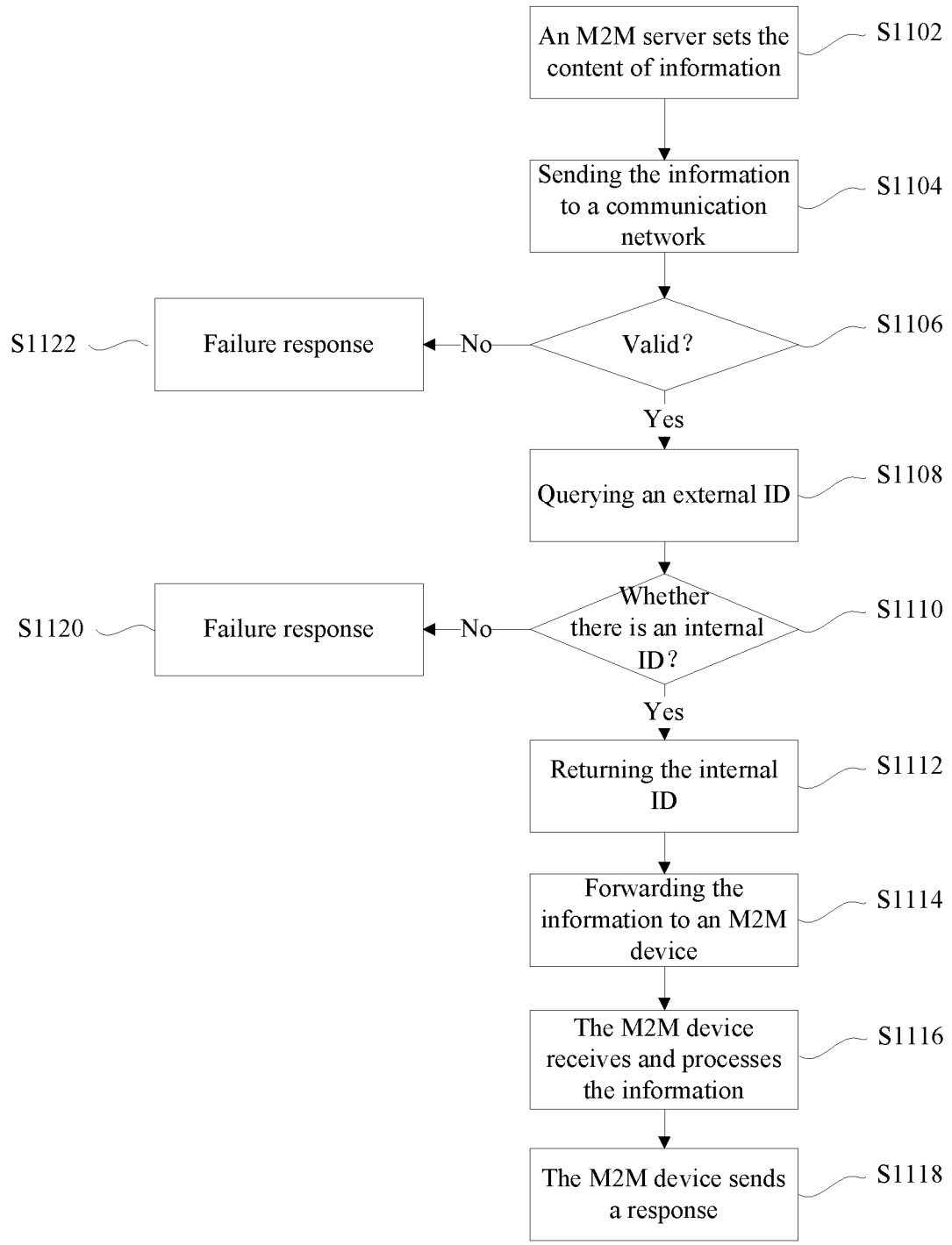
FIG. 11 is a diagram showing the flow of a method for identifying an M2M device according to a first embodiment of the present disclosure.

The embodiment describes a method for identifying an M2M device in a scenario of sending information from an M2M server to an M2M device, as shown in FIG. 11, the method includes the followings steps.

Step S1102: The M2M server sets the content of information to be sent to the M2M device.

In the step, the information may contain an external ID of the M2M device and an ID of the M2M server. The external ID of the M2M device contains two parts: a service ID or an application ID, and a device ID. The service ID or the application ID is used for identifying an M2M service or application, and a corresponding M2M service component is contained in the M2M device. The device ID indicates the M2M device itself. The specific content and length of the external ID are determined by an M2M service provider and/or a communication network operator.

Step S1104: The M2M server sends the information to a communication network.

The M2M server selects a transmission way and sends the information to the communication network in which a target M2M device is located, and the communication network is coupled with the M2M server.

It should be noted that the information may be in a form of IP packet or a form of Short Message Service (SMS).

Step S1106: The communication network judges whether the received information is valid, if the received information is valid, Step S1108 is executed; otherwise, Step S 1112 is executed.

The communication network carries out authentication and authorization according to the content of the received information. For example, the communication network judges whether the M2M server sending the information is authorized to send the information and whether the M2M device receiving the information is authorized to receive the information.

The judgment may be made according to the information in a user information database and/or local information. If the authentication and authorization are successful, the information is valid; otherwise, the information is invalid.

Step S1108: The communication network queries the M2M external ID through a user information database.

The user information database is located in the communication network; and the database saves a mapping relationship between the internal ID and the external ID of subscribed M2M user equipment.

Step S1110: The user information database judges whether there is an internal ID; if there is an internal ID, Step S1112 is executed; otherwise, Step S1120 is executed.

The database queries whether there is an external ID. If the M2M device has been subscribed in the database, then there is a corresponding external ID in the database; otherwise, there is no external ID in the database.

Step S1112: The database returns an internal ID of the M2M device. When an internal ID corresponding to the external ID is found through query, the database returns the internal ID.

Step S 1114: The communication network forwards the information to the target M2M user equipment.

The communication network sends the information to the M2M device according to the internal ID and selects a sending path.

Step S1116: The M2M user equipment forwards the information to a corresponding M2M service element for processing.

The target M2M user equipment forwards the information to the target M2M service element according to the content of the information; and the corresponding service element processes the information according to the content of the information, such as generating application data or communicating with an MTC application server.

Step S1118: The M2M user equipment sends response information to the M2M server, and the flow ends.

The M2M device sends response information to the M2M server through the communication network to indicate that the information has been received.

Step S1120: The database returns a query failure response to indicate that there is no corresponding external ID.

When failing to find the external ID, for example, a corresponding M2M device is not subscribed, the database returns a failure indication, and the failure reason is that there is no corresponding external ID.

Step S1122: The communication network sends a response to the M2M server to indicate that the information fails to be sent.

The communication network sends a failure indication to the M2M server, and the response contains a failure reason: for example, the M2M server is not authorized to send the information to the M2M device, or failing to find the external ID.

Embodiment 2

Figure 12:
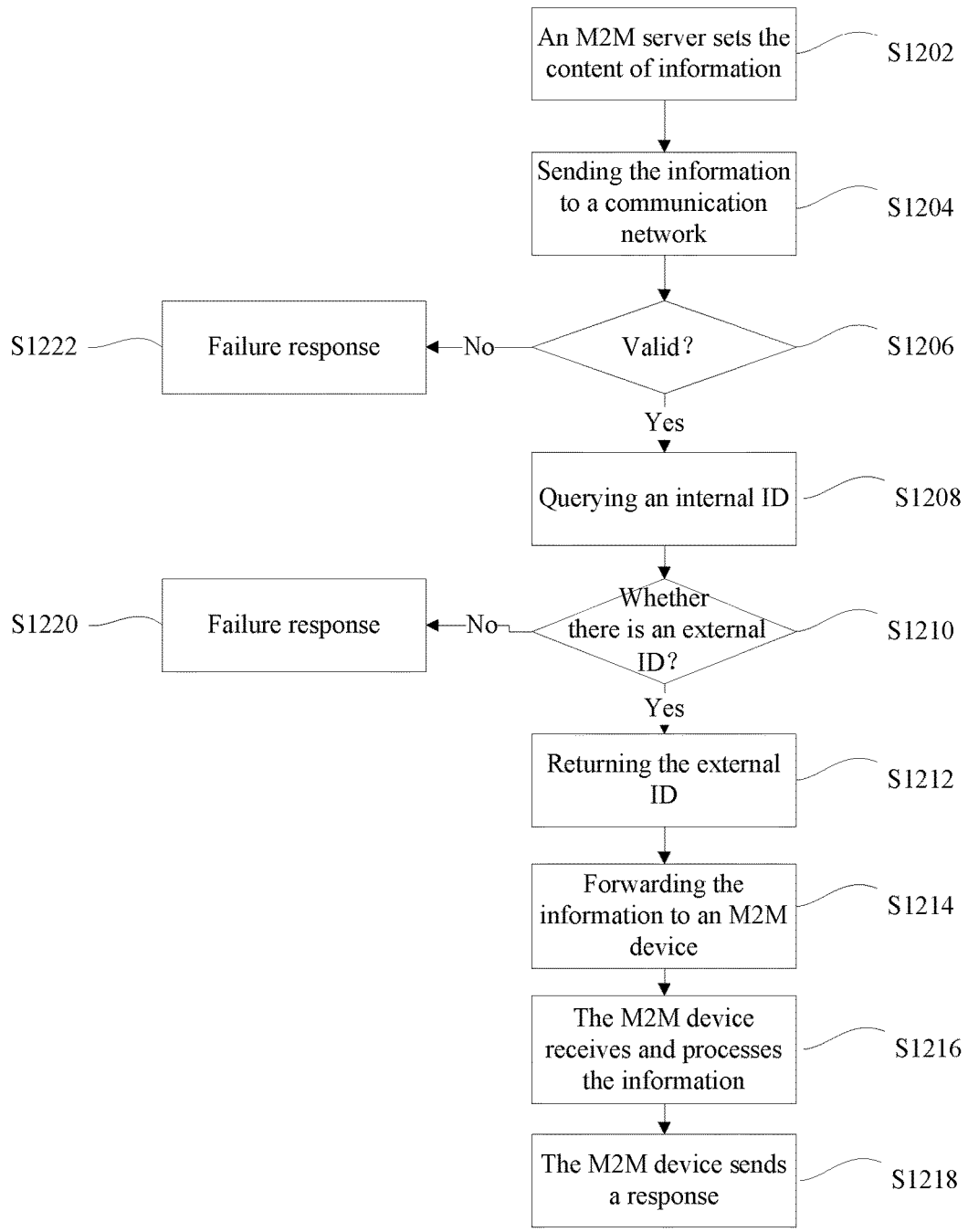
FIG. 12 is a diagram showing the flow of a method for identifying an M2M device according to a second embodiment of the present disclosure.

The embodiment describes a method for identifying an M2M device in a scenario of sending information from an M2M device to an M2M server, as shown in FIG. 12, the method includes the following steps.

Step S1202: The M2M device sets the content of the information to be sent to the M2M server.

The information contains the internal ID of the M2M device and the ID of the M2M server. The specific form of the internal ID is determined by the communication network where the M2M device is located, and keeps unique in the communication network.

Step S1204: The M2M device sends the information to a communication network.

The information may be in a form of IP data packet or SMS, and its specific form is determined by the communication network and/or the M2M device.

Step S1206: The communication network judges whether the received information is valid, if the received information is valid, Step S 1208 is executed; otherwise, Step S 1222 is executed.

The communication network carries out authentication and authorization according to the content of the received information. For example, the communication network judges whether the M2M device sending the information is authorized to send the information and whether the M2M server receiving the information is authorized to receive the information.

The judgment is made according to the information in a user information database and/or local information. If the authentication and authorization are successful, the information is valid; otherwise, the information is invalid.

Step S1208: The communication network queries the internal ID through a user information database.

The user information database is located in the communication network; and the database saves the mapping relationship between the internal ID and the external ID of subscribed M2M user equipment.

Step S1210: The user information database queries whether there is an external ID; if there is an external ID, Step S1212 is executed; otherwise, Step S1220 is executed. The database queries the external ID according to the received internal ID of the M2M device.

Step S1212: The database returns the external ID. The external ID is used for indicating the M2M device outside the communication network, including a service ID or an application ID, and a device ID.

Step S1214: The M2M device sends the information to the M2M server via the communication network. The communication network selects a path for sending the information, and forwards the received information to the M2M server. Generally, the service ID or application ID contained in the external ID is used for indicating a corresponding M2M server. For example, the SCE forwards the information to a corresponding M2M application server according to the external ID.

Step S1216: The M2M server receives and processes the information. The M2M server contains an SCE and an AS, the SCE forwards the information to the AS, and the AS receives and processes the information.

Step S1218: The M2M server sends response information to the M2M device, and the flow ends. The M2M server sends response information to the M2M device through the communication network to indicate that the information has been received successfully.

Step S1220: The database returns a query failure indication. If there is no internal ID of the M2M device in the database, for example, when the M2M device is not registered, then the database returns a failure indication to the M2M device, and the failure reason is that there is no internal ID of the M2M device.

Step S1222: The communication network sends a failure response to the M2M device. The communication network sends a failure response to the M2M device, and the failure response contains a failure reason, such as failure of authentication and authorization or failure of database query.

INDUSTRIAL APPLICABILITY

The technical solution provided by the embodiments and example embodiments of present disclosure can be applied to an M2M communication system. By virtue of the technical means, the to-be-sent information which is sent from the sending device to the communication network carries specified IDs, the recognizable ID can be acquired according to the specified ID, and the to-be-sent information can be sent to the target device according to the recognizable ID. The technical problem that that there is still no effective object identification solution which is compatible with various standard systems in the related arts is solved, and different M2M user equipment can be distinguished in the M2M communication system.

Obviously, those skilled in the art shall understand that the components or steps of the present disclosure may be implemented by general computing apparatus and centralized in a single computing apparatus or distributed in a network consisting of multiple computing apparatus. Optionally, the components or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. By doing so, the present disclosure is not limited to any specific combination of hardware and software.

The above are only example embodiments of the disclosure and not intended to limit the disclosure. For those skilled in the art, various modifications and changes can be made in the disclosure. Any modifications, equivalent replacements, improvements and the like within the principle of the present disclosure shall fall within the scope of protection defined by the claims of the present disclosure.

What is claimed is:

1. A method for sending information, which is applied to a Machine-to-Machine (M2M) communication system and comprises:
sending, by a sending device, to-be-sent information to a target device through a communication network, wherein the to-be-sent information carries one of the following specified identities (IDs): a first ID, which is used for identifying the target device outside the communication network, and a second ID, which is used for identifying the target device inside the communication network;
acquiring, by the sending device, a recognizable ID corresponding to the specified ID through the communication network; and
sending, by the sending device, the to-be-sent information to the target device through the communication network according to the recognizable ID;
wherein the to-be-sent information is sent in a form of IP packet;
wherein the first ID contains two parts: a service ID or an application ID, and a device ID;
wherein after sending the to-be-sent information to the target device, the target device forwards the information to a target M2M service element according to the content of the information, wherein the target M2M service element is configured to process the information according to the content of the information.

2. The method as claimed in claim 1, wherein acquiring, by the sending device, the recognizable ID corresponding to the specified ID through the communication network comprises one of the followings:
when the sending device is located outside the communication network and the target device is located inside the communication network, acquiring, by the sending device, an internal ID of the target device within the communication network through the communication network according to the first ID; and
when the sending device is located inside the communication network and the target device is located outside the communication network, acquiring, by the sending device, an external ID of the target device outside the communication network through the communication network according to the second ID.

3. The method as claimed in claim 1 or 2, wherein acquiring, by the sending device, the recognizable ID corresponding to the specified ID through the communication network comprises:
determining the recognizable ID according to a corresponding relationship between the first ID and the recognizable ID, wherein the corresponding relationship is preset in the communication network; or
determining the recognizable ID according to a corresponding relationship between the second ID and the recognizable ID, wherein the corresponding relationship is preset in the communication network.

4. The method as claimed in claim 1, wherein the second ID comprises at least one of the following IDs:
a device ID of the M2M device, and a user ID of the M2M device.

5. The method as claimed in claim 1, wherein the to-be-sent information further carries an ID of the sending device.

6. A method for forwarding information, which is applied to a Machine-to-Machine (M2M) communication system and comprises:
receiving, by a network side entity which is located in a communication network, to-be-sent information which is sent from a sending device to a target device through the communication network, wherein the to-be-sent information carries one of the following specified identities (IDs): a first ID, which is used for identifying the target device outside the communication network, and a second ID, which is used for identifying the target device inside the communication network;
acquiring, by the network side entity, a recognizable ID corresponding to the specified ID according to the specified ID; and
forwarding, by the network side entity, the to-be-sent information to the target device according to the recognizable ID;
wherein the to-be-sent information is sent in a form of IP packet;
wherein the first ID contains two parts: a service ID or an application ID, and a device ID;
wherein after forwarding the to-be-sent information to the target device, the target device forwards the information to a target M2M service element according to the content of the information, wherein the target M2M service element is configured to process the information according to the content of the information.

7. The method as claimed in claim 6, wherein acquiring, by the network side entity, the recognizable ID corresponding to the specified ID according to the specified ID comprises one of the followings:
when the sending device is located outside the communication network and the target device is located inside the communication network, acquiring, by the network side entity, an internal ID of the target device within the communication network according to the first ID; and
when the sending device is located inside the communication network and the target device is located outside the communication network, acquiring, by the network side entity, an external ID of the target device outside the communication network according to the second ID.

8. The method as claimed in claim 6 or 7, wherein acquiring, by the network side entity, the recognizable ID corresponding to the specified ID according to the specified ID comprises:
determining, by the network side entity, the recognizable ID according to a corresponding relationship between the first ID and the recognizable ID, wherein the corresponding relationship is preset in the communication network; or
determining, by the network side entity, the recognizable ID according to a corresponding relationship between the second ID and the recognizable ID, wherein the corresponding relationship is preset in the communication network.

9. The method as claimed in claim 6, wherein the second ID comprises at least one of the following IDs:
a device ID of the M2M device, and a user ID of the M2M device.

10. An apparatus for sending information, which is applied to a Machine-to-Machine (M2M) communication system and the apparatus comprises a hardware processor configured to execute program components stored on a memory, wherein the program components comprises:
a first sending component, which is located in a sending device and is configured to send to-be-sent information to a target device through a communication network, wherein the to-be-sent information carries one of the following specified identities (IDs): a first ID, which is used for identifying the target device outside the communication network, and a second ID, which is used for identifying the target device inside the communication network;

an acquisition component, which is located in the sending device and is configured to acquire a recognizable ID corresponding to the specified ID through the communication network; and a second sending component, which is located in the sending device and is configured to send the to-be-sent information to the target device through the communication network according to the recognizable ID;

wherein the to-be-sent information is sent in a form of IP packet;

wherein the first ID contains two parts: a service ID or an application ID, and a device ID;

wherein after sending the to-be-sent information to the target device, the target device forwards the information to a target M2M service element according to the content of the information, wherein the target M2M service element is configured to process the information according to the content of the information.

11. The apparatus as claimed in claim 10, wherein the acquisition component comprises:

a first acquisition element, which is configured to, when the sending device is located outside the communication network and the target device is located inside the communication network, acquire an internal ID of the target device within the communication network through the communication network according to the first ID; and/or a second acquisition element, which is configured to, when the sending device is located inside the communication network and the target device is located outside the communication network, acquire an external ID of the target device outside the communication network through the communication network according to the second ID.

12. An apparatus for forwarding information, which is applied to a Machine-to-Machine (M2M) communication system and the apparatus comprises a hardware processor configured to execute program components stored on a memory, wherein the program components comprises:

a receiving component, which is located in a network side entity in a communication network and is configured to receive to-be-sent information which is sent from a sending device to a target device through the communication network, wherein the to-be-sent information carries one of the following specified identities (IDs): a first ID, which is used for identifying the target device outside the communication network, and a second ID, which is used for identifying the target device inside the communication network;

an acquisition component, which is located in the network side entity and is configured to acquire a recognizable ID corresponding to the specified ID according to the specified ID; and a forwarding component, which is located in the network side entity and is configured to forward the to-be-sent information to the target device according to the recognizable ID;

wherein the to-be-sent information is sent in a form of IP packet;

wherein the first ID contains two parts: a service ID or an application ID, and a device ID;

wherein after forwarding the to-be-sent information to the target device, the target device forwards the information to a target M2M service element according to the content of the information, wherein the target M2M service element is configured to process the information according to the content of the information.

13. The apparatus as claimed in claim 12, wherein the acquisition component comprises:

a first acquisition element, which is configured to, when the sending device is located outside the communication network and the target device is located inside the communication network, acquire an internal ID of the target device within the communication network according to the first ID; and/or a second acquisition element, which is configured to, when the sending device is located inside the communication network and the target device is located outside the communication network, acquire an external ID of the target device outside the communication network according to the second ID.

* * * * *